(12) United States Patent
Wilke

(10) Patent No.: US 12,313,646 B2
(45) Date of Patent: May 27, 2025

(54) VEHICLE, SYSTEM, AND METHOD FOR DETERMINING A POSITION OF A MOVEABLE ELEMENT IN A VEHICLE

(71) Applicant: Aptiv Technologies AG, Schaffhausen (CH)

(72) Inventor: Detlef Wilke, Sibbesse (DE)

(73) Assignee: Aptiv Technologies AG, Schaffhausen (CH)

( * ) Notice: Subject to any disclaimer, the term of this patent is extended or adjusted under 35 U.S.C. 154(b) by 730 days.

(21) Appl. No.: 17/199,775

(22) Filed: Mar. 12, 2021

(65) Prior Publication Data
US 2021/0302463 A1    Sep. 30, 2021

(30) Foreign Application Priority Data
Mar. 24, 2020    (EP) .................................... 20165402

(51) Int. Cl.
*G01P 15/18* (2013.01)
*G01D 5/00* (2006.01)
*G06F 16/23* (2019.01)
*G06F 16/25* (2019.01)

(52) U.S. Cl.
CPC ............... *G01P 15/18* (2013.01); *G01D 5/00* (2013.01); *G06F 16/2365* (2019.01); *G06F 16/258* (2019.01)

(58) Field of Classification Search
CPC .... G01P 15/18; G06F 16/258; G06F 16/2365; G06F 3/017; G06F 18/25; G01D 5/00; G06T 7/70; G01B 21/00; B62D 15/0245
See application file for complete search history.

(56) References Cited

U.S. PATENT DOCUMENTS

| | | | |
|---|---|---|---|
| 2002/0049530 A1* | 4/2002 | Poropat ..................... | G01S 5/16 701/23 |
| 2015/0049199 A1* | 2/2015 | Rogers ................. | H04N 23/698 348/148 |
| 2015/0151784 A1* | 6/2015 | Moretti ................ | B62D 15/024 701/41 |

(Continued)

FOREIGN PATENT DOCUMENTS

| | | |
|---|---|---|
| DE | 10060287 | 6/2001 |
| DE | 102018202360 A1 | 8/2019 |

(Continued)

OTHER PUBLICATIONS

"Extended European Search Report", EP Application No. 20165402. 7, Sep. 22, 2020, 8 pages.

(Continued)

*Primary Examiner* — Aniss Chad
*Assistant Examiner* — Christopher George Fees
(74) *Attorney, Agent, or Firm* — Harness, Dickey & Pierce, P.L.C.

(57) ABSTRACT

A computer implemented method for determining a position of a moveable element in a vehicle comprises the following steps carried out by computer hardware components: acquiring a plurality of position related information data sets from at least one sensor; selecting at least one of the plurality of position related information data sets based on a pre-determined rule; and determining the position of the moveable element based on the at least one selected position related information data sets.

21 Claims, 3 Drawing Sheets

(56) References Cited

U.S. PATENT DOCUMENTS

| | | | |
|---|---|---|---|
| 2015/0210237 A1* | 7/2015 | Peterson | B60R 21/01538 |
| | | | 701/45 |
| 2016/0217577 A1* | 7/2016 | Tom | G06T 7/32 |
| 2017/0301111 A1* | 10/2017 | Zhao | H04N 17/002 |
| 2019/0054954 A1* | 2/2019 | Clochard | B62D 15/021 |
| 2019/0206084 A1* | 7/2019 | Noble | G06T 7/80 |
| 2019/0318181 A1* | 10/2019 | Katz | G06F 3/012 |
| 2020/0142410 A1* | 5/2020 | Liu | G05D 1/102 |
| 2022/0161815 A1* | 5/2022 | Van Beek | B60W 50/16 |
| 2022/0270358 A1* | 8/2022 | Cox | G06V 10/811 |
| 2023/0075659 A1* | 3/2023 | Futatsugi | G01S 17/89 |

FOREIGN PATENT DOCUMENTS

| | | |
|---|---|---|
| KR | 20130020126 | 2/2013 |
| KR | 101601294 | 3/2016 |
| WO | 2017140988 | 8/2017 |

OTHER PUBLICATIONS

First Notification of Office Action issued May 8, 2024 in Chinese Application No. 202110307165.3.

* cited by examiner

VEHICLE, SYSTEM, AND METHOD FOR DETERMINING A POSITION OF A MOVEABLE ELEMENT IN A VEHICLE

CROSS-REFERENCE TO RELATED APPLICATION

This application claims priority to European Patent Application Number 20165402.7, filed Mar. 24, 2020, the disclosure of which is hereby incorporated by reference in its entirety herein.

BACKGROUND

The present disclosure relates to vehicles, systems, and methods for determining a position of a moveable element in a vehicle.

Camera based systems in vehicles are provided for different purposes, for example to monitor the driver's eyes and head pose, for example to derive information about the driver's awareness or drowsiness. Such solutions may become mandatory for higher levels of automation. Other applications of camera systems include the determination of eye gaze, i.e. determining where the driver is looking at. Such information may not only be relevant for safety, but also for comfort features, such as selecting content on an infotainment system by looking at (virtual or real) objects.

A common position of cameras in a vehicle is on the steering wheel column (or short: steering column). That position offers a good view on the driver's face and eyes. However, as the steering wheel position may be adjusted to fit different driver sizes and preferences, the camera moves as the steering column moves. For example, the steering wheel and steering wheel column in a vehicle may be adjusted manually or electronically in a forward/backward direction and/or in an up/down direction.

The absolute position of the camera within the car may be required in order to map objects from a camera coordinate system to a vehicle coordinate system. One example may be the accurate localization of the head position with respect to the vehicle coordinate system in the context of eye gaze. If the camera position is uncertain, the viewing direction of a person cannot be precisely matched with elements inside or outside the car and may deliver wrong results to the car system. For example, if the driver is looking at the road and moves the steering column up or down, the driver monitoring systems may compute the output as looking on the cluster display.

Accordingly, there is a need to determine the (absolute) position of the camera with respect to the car coordinate system as the steering wheel column is adjusted. This may enable precise eye gaze and head localization. Similarly, there is a need to determine the position also for other moveable elements inside the vehicle, for example cameras or light sources mounted on other moving parts like HMI (human machine interface) screens, for example for compensating mounting tolerances and thermal movements of camera systems and their system parts in vehicles.

SUMMARY

The present disclosure provides a computer implemented method, a computer system, a vehicle, and a non-transitory computer readable medium according to the independent claims. Embodiments are given in the subclaims, the description and the drawings.

In one aspect, the present disclosure is directed at a computer implemented method for determining a position of a moveable element in a vehicle, the method comprising the following steps performed (in other words: carried out) by computer hardware components: acquiring a plurality of position related information data sets from at least one sensor; selecting at least one of the plurality of position related information data sets based on a pre-determined rule; and determining the position of the moveable element based on the at least one selected position related information data sets.

In other words, various position related information data sets are received from one or more sensors (for example in a priority and state machine, for example after processing by a position engine), and a pre-determined rule is applied (for example by the priority and state machine) to the received data sets, so as to select one or more of the data sets for determining (for example by priority and state machine) the position of a moveable element based on the selected data sets.

According to various embodiments, the method may detect and track the displacement and position of a camera or of light sources. The detected displacement and position may be an integral part of further processing, for example for determining a gaze direction of an occupant (for example driver or passenger) of the vehicle (for example car). According to the method, a fusion of all useful and available signals and sensors may be provided to determine the best possible accuracy of the camera position.

By using one or more sensors, and selecting one or more of position related information data sets provided by the one or more sensors, information may be fused into more precise information related to the position of the moveable element, or into information related to the position of the moveable element which is available faster, compared to using individual sensors only.

For example, for locating the precise position of the steering column for driver monitoring camera calibration, the information from multiple sensors may be fused and the movement of the vehicle during movement of the steering column may be taken into account.

It may be detected that a camera or its light source has moved in X,Y,Z, roll pitch, and/or yaw, so that a higher level method (which for example for its processing requires location information and/or orientation information of the camera or its light source) may know that the output data is invalid.

An estimated position change (which may include a location change and/or an angular (orientation) change) of the camera or light source may be quickly deriving, once the movement is identified, and in a second step, the estimated position may be refined to derive a more precise position of the camera or light source to re-enable valid outputs. The determined position may converge over time, when further information (for example position related information data sets) are available, to determine a more precise camera position or light source position.

According to another aspect, the computer implemented method further comprises the following step carried out by the computer hardware components: determining whether the moveable element is presently moving.

It has been found that processing in a two stage approach (first, determining whether a movement is present at all, and second, determining the new position during or after the movement) may reduce computational efforts. Furthermore, higher level methods may be informed about an ongoing movement, so that the higher level methods do not carry out processing based on invalid position information.

According to another aspect, all of the position related information data sets are provided in a common data format.

Providing the common data format even for different sensors simplifies processing such as the selecting of one or more of the position related information data sets, since the selecting may be carried out irrespective of the specific types of sensors or the specific sensor data formats of the sensors.

According to another aspect, each of the position related information data sets comprises at least one of the following: a previous absolute position of the moveable element, an indicator indicating whether the previous absolute position is valid, a precision of the previous absolute position, an accuracy of the previous absolute position, an updated absolute position of the moveable element, an indicator indicating whether the updated absolute position is valid, a precision of the updated absolute position, an accuracy of the updated absolute position, an indicator indicating whether a movement of the moveable element is presently ongoing, a certainty of a movement of the moveable element being presently ongoing, an indicator indicating a movement event in a pre-determined period of past time, an estimated distance of movement of the moveable element, a timestamp indicating time at which a movement of the moveable element was last detected, or a timestamp for at least one information included in the position related information data set.

It will be understood that accuracy refers to closeness of the measurements to a specific value, and that precision refers to the closeness of the measurements to each other. Certainty refers to the level of un/certainty/likelihood that the method has recognized an event or status (e.g. the camera position has moved with a certainty of 95%).

According to another aspect, the pre-determined rule is based on at least one of a precision of the previous absolute position of the respective position related information data set, an accuracy of the previous absolute position of the respective position related information data set, a precision of the updated absolute position of the respective position related information data set, an accuracy of the updated absolute position of the respective position related information data set, or a timestamp for at least one information included in the respective position related information data set.

The rule may involve selecting one or more position related information data sets that allow a fast determination of the position, or may involve selection one or more position related information data sets that allow an accurate determination of the position.

According to another aspect, the position is determined based on fusing at least portions of the selected position related data sets. For example, one position related information data set may be selected, and this selected position related information data set may be used for determining the position. In another example, two or more position related information data sets may be selected, and these two or more selected position related information data sets may be used for determining the position, for example by carrying out a mathematical function (for example a mean or weighted sum) involving the two or more position related information data sets.

According to another aspect, the selecting and the determining are carried out iteratively. For example, at a first stage, when only a few position related information data sets are available, the position related information data sets may be selected to allow for a fast (although potentially less accurate) determination of the position. Then, at a later stage, when more position related information data sets are available, the selecting may be carried out again, so as to select position related information data sets which allow for a more accurate determination of the position.

According to another aspect, the computer implemented method further comprises the following step carried out by the computer hardware components: providing the determined position to a further processing element for further processing the determined position.

The further processing element may carry out driver monitoring and/or cabin monitoring and/or gesture monitoring. For example, the further processing element may provide an eye gaze vector indicating where an occupant (for example driver or passenger) of a vehicle (for example car) is looking at. The further processing element may for example be a vision core for image based computations.

According to another aspect, the computer implemented method further comprises the following steps carried out by the computer hardware components: determining an accuracy of the determined position; and providing the determined accuracy of the determined position to the further processing element.

The determined accuracy (which may also be referred to as precision information) may be added to the determined position, so that higher level methods may make decisions with (in other words: based on) precision information on the signal that they receive. For example, the higher level methods may carry out a specific processing if the precision of the position of the camera or light source is low, and may carry out a different processing if the precision of the position of the camera or light source is high.

According to another aspect, the moveable element comprises at least a portion of one of the following: a steering element of the vehicle, a housing of a further sensor, a steering element column of the vehicle, a headrest of a vehicle seat.

According to another aspect, the at least one sensor comprises at least one of a camera, an accelerometer, a gyroscope, a switch, a linear encoder, or a rotary encoder. For example, the sensors may be absolute sensors, for example angle sensors or way sensors.

According to another aspect, the position comprises at least one of a two-dimensional position (in other words: a two-dimensional location), a three-dimensional position (in other words: a three-dimensional location), a six-dimensional position (which may include location and orientation), at least one of a Cartesian coordinate (which may be one coordinate of a location), or at least one of a three-dimensional orientation.

In another aspect, the present disclosure is directed at a computer system, said computer system comprising a plurality of computer hardware components configured to carry out several or all steps of the computer implemented method described herein.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

The system may include a movement event detector and an associated priority and state machine, and a position engine and an associated priority and state machine. The system may also be referred to as fusion system (or fusion engine), due to fusing the various position related information data sets.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

In another aspect, the present disclosure is directed at a vehicle comprising: the computer system as described above, the moveable element, and the at least one sensor.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

While in the following, embodiments are described related to a camera mounted on a steering column with a driver monitoring system that has the target to determine the eye gaze vector in absolute car coordinates (i.e. to determine where the driver is looking), it will be understood that that various embodiments may be applied to generally compute the positions of moveable elements, like cameras and light sources for other systems. The moveable elements may be on other parts, which are designed to be moving, for example due to thermal expansion, vibration, ageing, and/or mounting tolerances.

Figure 1:
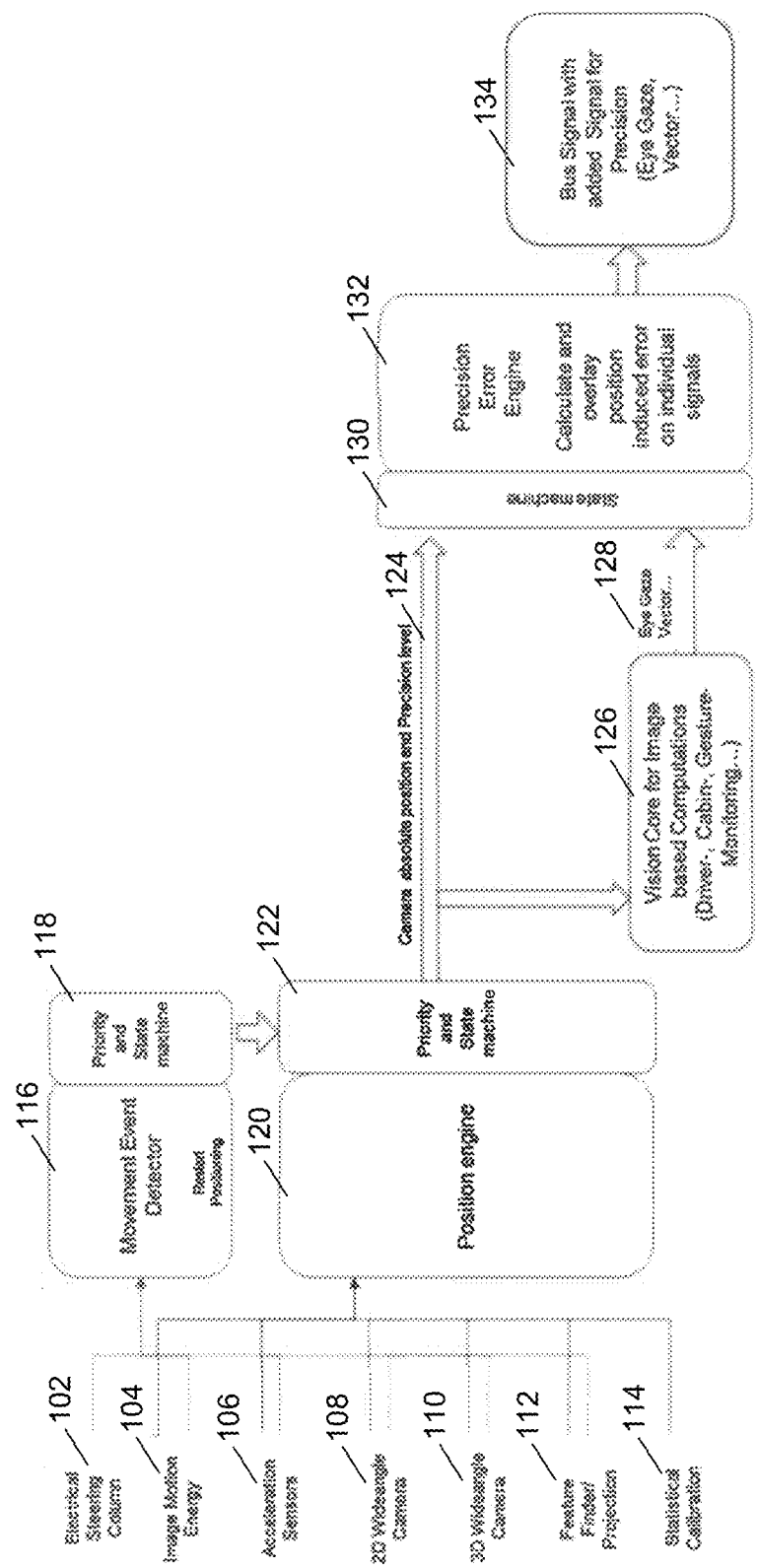
FIG. 1 a fusion system according to various embodiments.

FIG. 1 shows a fusion system 100 (in other words: fusion engine) according to various embodiments. The fusion system 100 includes a movement event detector 116, which may determine whether determining the position of the moveable element is necessary, which may be referred to as "restart positioning". Determining the position of the moveable element may be necessary due a movement of the moveable element. The fusion system 100 may further include a position engine 120, which may determine the position of the moveable element.

The movement event detector 116 and the position engine 120 may receive input data 102, 104, 106, 108, 110, 112, 114 from one or more sensors, and may combine a subset or all of the input data 102, 104, 106, 108, 110, 112, 114.

The input data 102 provided by the electrical steering column may include a switch status (for example related to the motion direction) and an activation time. If the steering wheel displacement (and thus the movement of the steering column) is controlled electronically and there is detailed sensor information available, e.g. on the vehicle bus, by how much the steering wheel has been displaced, that information may be directly mapped to a camera translation and rotation. A calibration step may be required if relative and not absolute sensing is used. Relative positioning methods for this are stepper motors steps as delta from extreme or center positions.

A driver facing camera may provide input data 104, which may include image motion energy (which may also be referred to as scene motion energy) in an image sequence of the driver facing camera. The image motion energy may indicate motion energy in different areas and derived information like direction, distance and time of movement(s). In the image motion energy, local movements, e.g. of a person, may be ignored.

The input data 106 may be provided by one or more acceleration sensors in the steering column or attached to the body of the vehicle may include XYZ acceleration and derived signals (for example a vector to the center of gravity).

The input data 108 may include image information from at least one additional 2D camera with a known fixed location in the vehicle, that can see the driver monitoring camera or parts connected to the steering column or features which the driver monitoring camera can also see.

The input data 110 may include image information from an additional 3D camera with a known fixed location in the vehicle, that can see the driver monitoring camera or parts connected to the steering column or features which the driver monitoring camera can also see.

The input data 112 may include data from a feature finder/projection described in the following. The camera system may further provide projections (shadows by two or more homogeneous light sources or inhomogeneous pattern projection from the camera system) or HW (hardware) features in the car (e.g. like window lines, handles, symbols) or light sources directly being visible in the image. A combination of those is also possible.

Light sources and HW features may be visible in IR (infrared) and/or VIS (visible) light or may just be visible in parts of the light spectrum (for example IR light sources, VIS light sources, or special surfaces that reflect or absorb IR light only).

A camera based detection method of the steering wheel is addressed in European Patent Application No. 19 167 433.2, which is incorporated herein by reference in its entirety; the method of that patent application may be used as a position engine according to various embodiments, for example a position engine related to input data 112 of feature finder/projection.

The input data 114 may include statistical calibration data derived from the driver behavior through the driver monitoring system (for example statistical evaluation of the driver looking at known or expected targets like the road ahead and correcting the camera positon until the expected gaze vectors fit).

The various input data 102, 104, 106, 108, 110, 112, 114 (which may be different information from the sensors as described above) may be processed and fused in the movement event detector 116 and the position engine 120. The movement event detector 116 may compute the certainty/likelihood of a movement for each input. The priority and state machine 118 may decide if a movement has happened. Inputs may be rated by priority and certainty and multiple input certainties may be added based on priorities to a combined certainty.

According to various embodiments, a state machine is used to use all available useful input data (in other words: sensor data), for example after processing by the movement event detector 116 and/or the position engine 120, and to omit those input data is not available (for example, because the respective sensor is not mounted in that specific vehicle). Thus, the system may run with a minimal sensor set and may gain accuracy and speed of detection when more sensors are available.

For each sensor, a method may be provided in the movement event detector 116 and the position engine 120 to compute the sensor inputs to a standard (in other words: a standard output; in other words: a position related information data set).

For example, the output of the movement event detector 116 (in other words: movement detector or movement engine) may include the following data: an indicator indicating whether movement is presently ongoing (which may be a binary value); and/or an indicator indicating a certainty of movement (which may be an integer number, or a real number, for example indicating a percentage in a range of 0 to 100 (for example 0% to 100%), wherein for example a value of 255 may indicate that the indicator is not available, i.e. that a reliable information regarding the certainty of movement is not available); and/or an indicator indicating whether a movement event took place during a pre-determined time period (for example during a pre-determined length of time preceding the present time, for example during (or in) the last 500 ms), which may be a binary value (for example "true" or "false"); and/or an indicator indicating an estimated distance of movement (which may be a signed integer value, wherein a value of 0 may indicate that the indicator is not available, i.e. that a reliable information regarding the estimated distance of movement is not available); and/or an indicator indicating a timestamp of the last movement detection.

For example, the output of the position engine 120 may include the following data: a previous (in other words: old) absolute position (in other words: a position before the last movement detection), optionally including a timestamp; and/or an indicator indicating whether the old (absolute) position is still valid (which may be an binary (or Boolean) value, and which may be reset by a movement detection), optionally including a timestamp; an indicator indicating a certainty of the old (absolute) position (which may include a values of X, Y, Z, Yaw, Pitch, Roll), optionally including a timestamp; and/or an indicator indicating an accuracy of the old (absolute) position (which may include a values of X, Y, Z, Yaw, Pitch, Roll), optionally including a timestamp; and/or an indicator indicating whether the new (absolute) position is still valid (which may be an binary (or Boolean) value, and which may be reset by a movement detection), optionally including a timestamp; an indicator indicating a new absolute position (after a last recognition of position), optionally including a timestamp; and/or an indicator indicating a certainty of the new (absolute) position (which may include a values of X, Y, Z, Yaw, Pitch, Roll), optionally including a timestamp; and/or an indicator indicating an accuracy of the new (absolute) position (which may include a values of X, Y, Z, Yaw, Pitch, Roll), optionally including a timestamp.

For example, the movement event detector 116 may include a movement detector for movements of the steering column. A detected movement of the steering column (and thus, a movement of a camera mounted on the steering column) may disable driver monitoring outputs of the system that are impacted by the movement, and may trigger a new camera position acquisition.

The various inputs may be fused with priorities and a state machine that is able to do "or" and "and" functions to further verify movement detections. As an illustrative example, the input data 102 from the electrical steering column may have the highest priority and may always have 100% certainty of movement, and the input data 114 from statistical calibration may have the lowest priority and the lowest certainty at the start but may improve over time. In another example, different inputs may lead to the following detection outputs at 118: the input data 104 of the image motion energy may detect with 70% certainty, the input data 112 of the feature finder/projection may detect with 90% certainty, and the input data 106 of the acceleration sensors may detect with 70% certainty. The input data 112 of the feature finder/projection may have priority and thus the result may be "Movement by 90%".

The inputs may be one or more of the following: input 102 from electrical steering column that movement is ongoing (when mounted in car); input 104 computed information from the image motion energy detector that the camera is being moved; input from image based HW feature finder of driver monitoring camera; input 106 from a (single) acceleration sensor in a camera for angle and horizontal movements; input 106 from one or two x-axis acceleration/angle sensor(s) in the camera and/or car body (wherein either a single sensor may be used to compute the angle of the camera towards the car body/earth, or such a sensor in the camera may be used and an additional sensor in the car body may be used to compute the delta between these two sensors (mitigating the problem of a car standing on an unlevel road or driving/accelerating); input from a (high resolution) ABS (anti-lock braking system), which may indicate the wheel rotation to get high resolution horizontal acceleration data for 'subtraction/integration" time for input data 106 from the acceleration sensor(s) (for example, when the computed acceleration from the ABS sensors is computed with an acceleration of 1.5 g (wherein g is the acceleration corresponding to the gravitational force equivalent), then this value may be added to a the measured 3-axis acceleration signals 106 of a sensor in the steering column and thus correct the computed angles of 106 towards the car coordinate system); input from a (high resolution) wheel to body position sensor to get vertical acceleration data for subtraction/integration time, usually used for light beam corrections; input indicating the driving state (for example driving, parking, or braking); input 108, 110 from an additional fixed mounted 2D camera or 3D camera to determine movements of the steering column and/or camera on the steering column.

According to various embodiments, the inputs may be binary (or Boolean) signals (for example, indicating whether the camera is moved or whether the camera is stationary). According to various embodiments, the inputs may be likelihoods that the camera is moved (for example a numeric value, e.g. from 0 to 1, where 0 means stationary, 1 means very likely to be moved, etc.). According to various embodiments, the inputs may be a combination of binary and numeric inputs.

According to various embodiments, a fast determination of a new estimated position of the steering column may be provided to re-enable outputs with lowered accuracy. While more information (for example more input data or more precise input data) becomes available over time, the estimated position may converge towards a more and more precise position over time.

If a (single) sensor can provide a fast estimated position and over time a more precise position it might be duplicated inside the position engine 120. Two separate position engines may be provided from a single sensor. For example, one fast but inaccurate position from input data 106 and one very slow but accurate position information also the same input data 106 may be provided. The timestamp for each individual position determination may be stored and used by the priority and state machine, like will be described in more detail below.

What is described for a single sensor, also applies when a combination of (multiple) sensors can achieve a result in combination that otherwise could not be achieved. For this, the sensors may be combined in a separate position engine. This may enable the determination of the position more precisely or in more axes.

An example may be an optical feature finder with image data from a steering column camera, that has view on too little features visible or detected in the car to compute the needed absolute position for the camera in all 6 axes of the camera position, so that it may only deliver a pitch angle. A second camera system (e.g. including a 2D wide-angle cabin camera) may be used to provide data for fusion with the pitch angle. The added axes information of this second system may be added to be able to find the needed xyz information of the camera position.

According to various embodiments, one or more of the following may be determined for each sensor individually: delta (in other words: difference or amount of change) of the camera position, absolute camera position, and/or estimated error of the camera position.

Each individual sensor calculation may be put into a priority and state machine (i.e. priority and state machine 118 for the movement event detection, and priority and state machine 122 for the position determination) that takes the most recent and most accurate data 124 to forward it to the precision error engine 132 For example, precise sensor information may be used as soon as it gets available. Thus, the sensor data that is available first (but may be less accurate) may be used by the higher level methods (for example the vision core for image based computations 126 (for example driver monitoring, cabin monitoring, and/or gesture monitoring, which may for example provide an eye gaze vector 128 as an output) to partly enable functionality of the higher level methods again (after the movement has ended), potentially with lowered performance or accuracy (due to the lower accuracy of the position determination). As soon as a slower sensor or sensor group has aggregated enough information to be available, this data may be used, if it is more accurate than the currently used sensor data. With this principle, the position data is available fast (although possibly less accurate) and gains accuracy over time.

According to various embodiments, fused or individual absolute position may be fed back to the other position engines. The most precise position information may be fed back (or written back) to certain or all position engines with lower accuracy to increase the individual precision in the next calculation. The precision of the calculated position may be used to compare it to the precision of a position engine before writing the absolute position back to the position engines. Some position engines may have a lower accuracy. For these position engines, a more precise absolute position information can be directly written back. For example, a less accurate acceleration based position engine may get the absolute position of a camera based feature finder position engine when it has acquired the position precisely.

Position engines which may provide position estimation of lower accuracy (but for which the position estimation may be available fast) are relative position sensors, inputs from the electrical steering columns, input from a driver camera image motion energy detector, a single (axis) acceleration sensor in a camera, a dual (axes) acceleration sensor in a camera and/or car body and/or ECU (electronic control unit).

Relative position sensors may not be able to provide an absolute position, but relative movements, and a stored absolute position per sensor may be used for determining the (absolute) position. The relative position change from the sensor computation may be used to determine the new absolute sensor position. For each individual sensor, an individual absolute position may be stored (for example in the priority and state machines). When a more precise position is determined (by any of the position engines), then this more precise position may be used for updating the stored absolute camera position of all lower precision sensors as described above. The individual absolute position data per sensor may be used to be able to compare all absolute positions and build a decision what absolute position to use (for example, verify and/or omit and/or using a median).

Input data may be provided from the electrical steering column. The runtime in each axis during the movement of the electrical steering column may be used to determine an estimated change of position by multiplying the runtime with the movement per time. For AC (alternating current) or DC (direct current) motors, fixed or dynamic variables may be used for the determination of the movement angle and/or distance per running time of the motors. The calculation may depend on one or more variables:

$\Delta Pos = \Delta T * f_1(T, Pos, Temp, Angle, Volt, Amp, PWM)$ $\Delta Angle = \Delta T * f_2(T, Pos, Temp, Angle, Volt, Amp, PWM)$ These equations may take into consideration that the speed of movement of an electrical steering column may be slower due to mechanical resistance at different positions (Pos, Angle), slower or faster due to Temperature (Temp), available Voltage in the car (Volt) (for example depending on whether the engine is running or stopped), the used current during movement (Amp), the pulse-width modulation parameters used to control the motor if applicable (PWM, frequency, on/off ratio). According to various embodiments, not all of these parameters, but only a (real) subset of parameters may be used.

Ramp up and ramp down of motor speed may be included in the equation, if such information is available and if the ramp up and ramp down of motor speed is applicable. For stepper motors, the number of steps being issued during the movement may be multiplied with a fixed value that corresponds to the position change per step. The motor current may be taken into consideration to determine if an end-stop was reached (for example when no end stop switch data is available).

Input data from a driver camera image motion energy detector may be taken into account. The speed of movement in the image plane per n (with an integer number n) frames and the duration of movement per frame from the motion energy in a specific part of the picture may be derived and used to calculate the total position change with the known distance in car coordinates from the camera to the part, that was used to derive the movement in the image plane. The distance may be computed from known fixed background parts in the picture (for example shape of B-pillar, shape of rear window, and/or shape of side window) and/or from recognized moving parts in the picture that are stable during the movement and where one or more dimensions can be calculated (for example seats, headrests, and/or outlet for belt).

Input data from a single acceleration sensor in a camera may be taken into account. The angle difference before and after the movement may be determined, for example supported by automatic headlight adjustment data based on shock absorber compression. The data may be harmonized to a tilt angle of the car body against the vector to the center of gravity. The determination of the angle difference may be supported by GPS (global positioning system)/navigation map data to determine the angle of the street that the car is standing or driving on. A horizontal position difference before and after the movement may be determined, for example, supported by automatic headlight adjustment data based on shock absorber compression. The data may be harmonized to a tilt angle of the car body against the vector to the center of gravity. During driving or parking, the estimated movement of the steering column may be determined by the integration of acceleration and time to determine the relative movement. The precision may be lower when additionally the car accelerates or decelerates during the movement. Data from ABS wheel sensor data may be used to determine if the car body accelerates during the movement of the steering column. The car body acceleration data may then be subtracted from the accelerometer data.

Input data from dual (axes) acceleration sensors in a camera and a car body (or an ECU) may be taken into account. A delta (or difference) of both sensors (i.e. the acceleration sensor in the camera and the acceleration sensor in the car body or ECU) may be used to derive position change relative to the car body.

As described above, combinations of sensors may be computed and used as an additional input to the position engine.

Position engines which provide a precise position may include an image based feature finder, statistical calibration, and/or additional 2D or 3D cameras. Precise position may be defined as an absolute position which is precise enough to fulfill the high level precision requirements for the total system (for example eye gaze target with a required accuracy).

Input data from an image based feature finder may be taken into account. Features (for example mechanical, visible parts in the car) or projected features (for example points, point clouds, or grids) on surfaces with known absolute position may be recognized in the image plane of the driver camera. Based on size and position in the image plane, the absolute position of the camera may be calculated. From the known positions of the features with respect to the car system and the known physical constraints of the camera positions and degrees of freedom for the camera movement, an equation may be derived to determine the camera position in space. The higher the degrees of freedom for the camera, the more known features are needed to solve the equation. The resolution of the system may depend on the size and/or distance of the features to the camera and the spacing between the features. The camera resolution and the accuracy of the mounting position inside the car may determine the precision.

Input data from statistical calibration may be taken into account. A heat map of eye gazes or head direction may be used to calibrate out (in other words: to compensate) camera position errors and individual user eye and head variation. The data may be supported by information on driving speed, differential speed and/or steering wheel angle to determine a driving environment for a decision if the statistical base is relevant enough. Data on whether the vehicle is driving on a highway, in a city (using start/stop functions), or a parkway may be used. GPS data and navigation information may be used to increase precision of the decision (or determination). The data may be supported by HMI (human machine interaction) systems (for example it may be assumed that a user touching a non-haptic HMI feature, for example a touch screen, has looked at it before or during the execution).

Input data from an additional 2D camera or 3D camera may be taken into account. According to various embodiments, the camera may be directly detected and localized in the image of the additional camera. According to various embodiments, the steering wheel may be detected and localized in 3D space (related to the additional camera). The absolute position in the car system may be determined. An optical marker (for example a passive marker or an actively illuminated marker) may be provided on the steering column parts (including the steering column camera), and may be used to be recognized by a 2D wide-angle camera. A 3D camera may recognize a surface, distance and/or pattern on steering column parts to determine the position.

A precision error engine 132 may overlay the error caused by the camera position error on the output signals of the driver monitoring system. The precision error engine 132 may be fully or partially included in the vision core for image computations 126. The effect of the inaccuracy of the camera position is fused into the precision signal of the individual outputs of the vision core for image based computations 126 (for example driver monitoring). For example, the eye gaze vector 128 may be used for a calculation of an intersection with a surface (e.g. cluster). The eye gaze direction vector 128 from the eyes may be calculated by the vision core for image based computations 126. The vision core for image based computations 126 may use measures to determine the precision of its computed outputs (for example jitter on statistical base). When the camera position is unknown (directly after a movement), the eye gaze signal may be set to "unavailable" while other signals like "eye closure" may stay enabled. When shortly later the camera position estimation is available, with position and precision, the vision core for image based computations 126 may output the gaze direction vector 128. Inside the precision error engine 132, the camera position may be used to add the inaccuracy to the computed error signal to the gaze vector. The precision error engine 132 may output a bus signal 134 with added signal for precision. A state machine 130 may select the most accurate and/or most recent and/or most reliable signals for usage. The signals may be mixed from different sensors (for example the pitch angle may be used from the input 112 while the z axis position may be used from input 102 and so on).

Figure 2:
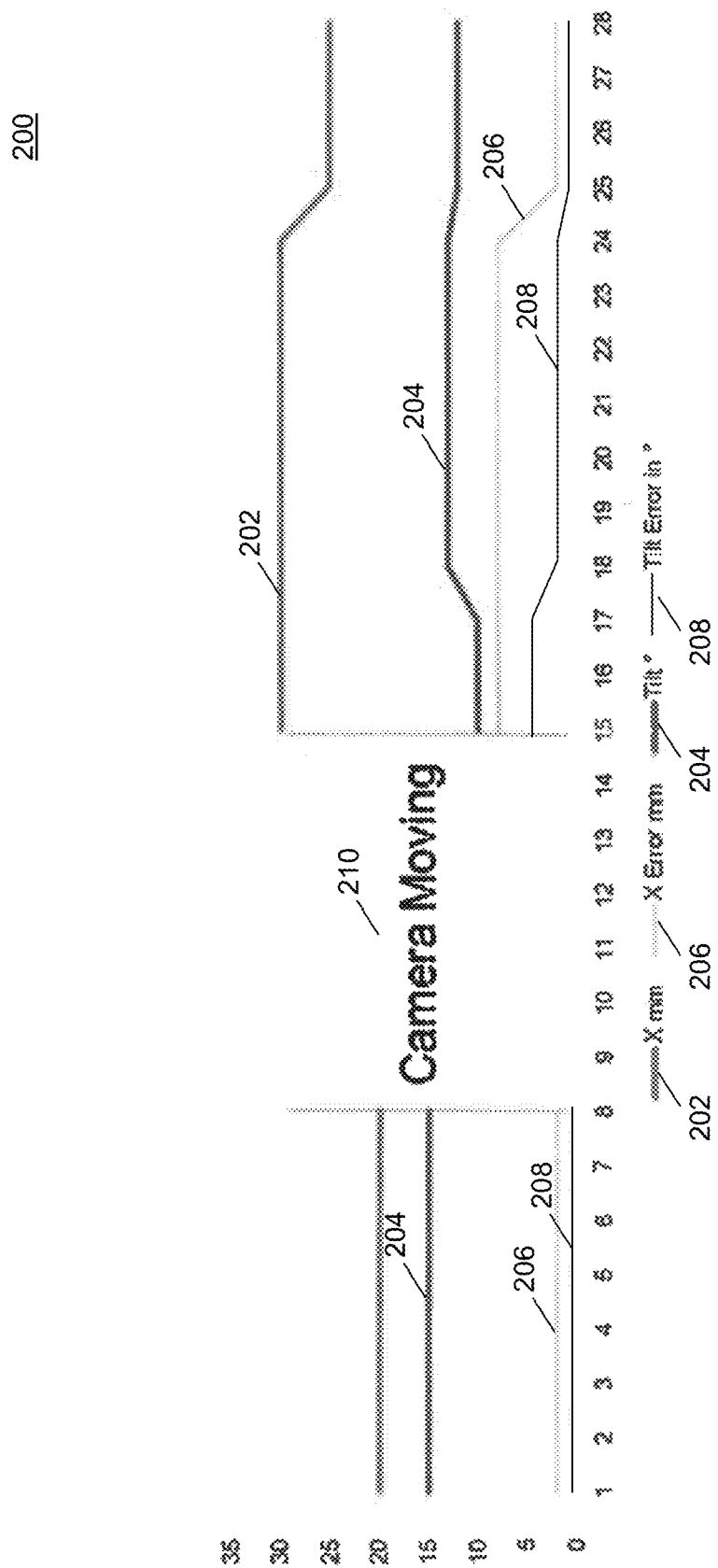
FIG. 2 an illustration of a result of computation at an output of a priority and state machine over time according to various embodiments.

FIG. 2 shows an illustration 200 of a result of computation at the output of the priority and state machine 122 over time illustrating the behavior of the priority and state machine 122 according to various embodiments. To simplify the diagram, only the X and tilt components of the location are shown. The car coordinate system may be the nominal camera position. Lines 202 indicate the X position, lines 204 the tilt angle, lines 206 the X position error, and lines 208 the tilt angle error. A horizontal axis indicates the time. In the example shown in FIG. 2, from 1 to 8 seconds, the determined absolute camera position and precision are in a stable state (for example with a determined (or estimated) camera position at X=+20 mm, tilt angle=+15°, X error+0.2 mm, and tilt angle error +/−0,5°).

From 8 to 15 seconds, the steering column is moving (like indicated by reference sign 210), and thus the output for the determined position is disabled.

After stop of the movement, the steering column motors runtime and direction information is used to quickly determine an estimated position (for example with a determined (or estimated) camera position at X=+30 mm, tilt angle=+ 10°, X error+0.8 mm, and tilt angle error +/−5°).

At 17 seconds, the integration of the accelerometer based position has finished. This sensor now has a more precise position information (for example with a determined (or estimated) camera position at X=+30 mm, tilt angle=+13°, X error+0.8 mm, and tilt angle error +/−2°) and is used instead of the steering column sensor data.

At 24 seconds, the vision based feature finder has found a more precise position (for example with a determined (or estimated) camera position at X=+25 mm, tilt angle=+12°, X error +0.2 mm, and tilt angle error +/−0,5°) and this is applied.

Once no position which is more precise than the presently determined position is available, this is the stable state for the new position.

Figure 3:
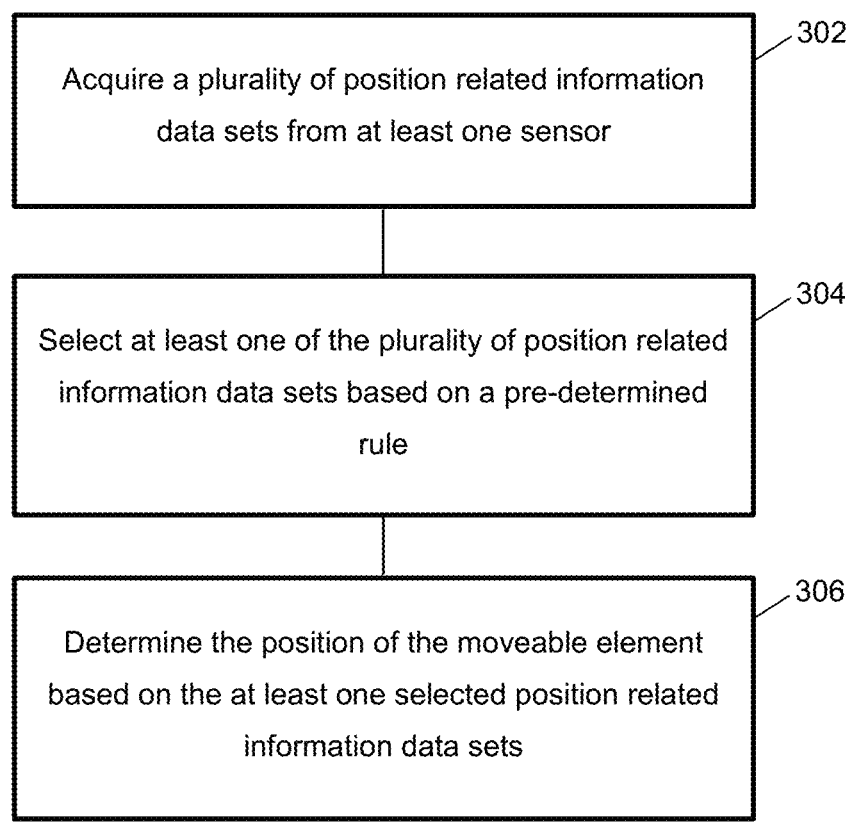
FIG. 3 a flow diagram illustrating a method for determining a position of a moveable element in a vehicle according to various embodiments.

FIG. 3 shows a flow diagram 300 illustrating a method for determining a position of a moveable element in a vehicle according to various embodiments. At 302, a plurality of position related information data sets may be acquired from at least one sensor. At 304, at least one of the plurality of position related information data sets may be selected based on a pre-determined rule. At 306, the position of the moveable element may be determined based on the at least one selected position related information data sets.

According to various embodiments, it may be determined whether the moveable element is presently moving.

According to various embodiments, all of the position related information data sets may be provided in a common data format.

According to various embodiments, each of the position related information data sets may include at least one of the following: a previous absolute position of the moveable element, an indicator indicating whether the previous absolute position is valid, a precision of the previous absolute position, an accuracy of the previous absolute position, an updated absolute position of the moveable element, an indicator indicating whether the updated absolute position is valid, a precision of the updated absolute position, an accuracy of the updated absolute position, an indicator indicating whether a movement of the moveable element is presently ongoing, a certainty of a movement of the moveable element being presently ongoing, an indicator indicating a movement event in a pre-determined period of past time, an estimated distance of movement of the moveable element, a timestamp indicating time at which a movement of the moveable element was last detected, or a timestamp for at least one information included in the position related information data set.

According to various embodiments, the pre-determined rule may be based on at least one of a precision of the previous absolute position of the respective position related information data set, an accuracy of the previous absolute position of the respective position related information data set, a precision of the updated absolute position of the respective position related information data set, an accuracy of the updated absolute position of the respective position related information data set, or a timestamp for at least one information included in the respective position related information data set.

According to various embodiments, the position may be determined based on fusing at least portions of the selected position related data sets.

According to various embodiments, the selecting and the determining may be carried out iteratively.

According to various embodiments, the determined position may be provided to a further processing element for further processing the determined position.

According to various embodiments, an accuracy of the determined position may be determined, and the determined accuracy of the determined position may be provided to the further processing element.

According to various embodiments, the moveable element may include or may be at least a portion of a steering element of the vehicle and/or a housing of a further sensor and/or a steering element column of the vehicle and/or a headrest of a vehicle seat.

According to various embodiments, the at least one sensor may include at least one of a camera, an accelerometer, a gyroscope, a switch, a linear encoder, or a rotary encoder.

According to various embodiments, the position may include or may be at least one of a two-dimensional position, a three-dimensional position, a six-dimensional position, at least one of a Cartesian coordinate, or at least one of a three-dimensional orientation.

Each of the steps 302, 304, 306 and the further steps described above may be performed by computer hardware components.

What is claimed is:

1. A method, comprising:
    determining an absolute position of a camera mounted on a steering wheel column in a vehicle with respect to a vehicle coordinate system by at least:
        acquiring a plurality of position related information data sets from a plurality of sensors,
        selecting at least one of the plurality of position related information data sets based on a pre-determined rule,
        determining whether the camera mounted on the steering wheel column is stationary based on at least one plurality of position related information data sets, and
        in response to determining that the camera is stationary, iteratively determining the absolute position of the camera using, in each subsequent iteration, different ones of the plurality of position related information data sets captured by different ones of the plurality of sensors that have a higher degree of accuracy;
    electronically monitoring a cabin of the vehicle based on image data received from the camera and the determined absolute position of the camera; and
    electronically controlling one or more vehicle control units of the vehicle based on a result of the electronically monitoring of the cabin based on the image data received from the camera and the determined absolute position of the camera.

2. The method of claim 1, further comprising:
    converting each of the plurality of position related information data sets into a same data format.

3. The method of claim 1, wherein each of the position related information data sets comprises at least one of:
    a previous absolute position of the camera;
    an indicator indicating whether the previous absolute position is valid;
    a precision of the previous absolute position;

an accuracy of the previous absolute position;
an updated absolute position of the camera;
an indicator indicating whether the updated absolute position is valid;
a precision of the updated absolute position, an accuracy of the updated absolute position;
an indicator indicating whether a movement of the camera is presently ongoing;
a certainty of a movement of the camera being presently ongoing;
an indicator indicating a movement event in a pre-determined period of past time;
an estimated distance of movement of the camera;
a timestamp indicating time at which a movement of the camera was last detected; and
a timestamp for at least one information included in the position related information data set.

4. The method of claim 3, wherein the pre-determined rule is based on at least one of:
a precision of the previous absolute position of the respective position related information data set;
an accuracy of the previous absolute position of the respective position related information data set;
a precision of the updated absolute position of the respective position related information data set;
an accuracy of the updated absolute position of the respective position related information data set; and
a timestamp for at least one information included in the respective position related information data set.

5. The method of claim 1, further comprising:
determining the absolute position based on fusing at least portions of the selected position related data sets.

6. The method of claim 1, wherein the selecting and the determining are carried out iteratively.

7. The method of claim 1, further comprising:
providing the determined absolute position to a further processing element for further processing the determined absolute position.

8. The method of claim 7, further comprising:
determining an accuracy of the determined absolute position; and
providing the determined accuracy of the determined absolute position to the further processing element.

9. The method of claim 1, wherein the plurality of sensors comprises at least one of a further camera, an accelerometer, a gyroscope, a switch, a linear encoder, or a rotary encoder.

10. The method of claim 1, wherein the absolute position comprises at least one of a two-dimensional position, a three-dimensional position, a six-dimensional position, at least one of a Cartesian coordinate, or at least one of a three-dimensional orientation.

11. The method of claim 1, further comprising:
mapping an object within the cabin of the vehicle captured by the camera from a camera coordinate system to the vehicle coordinate system based on the determined absolute position of the camera.

12. The method of claim 1, wherein the plurality of sensors include a first sensor and a second sensor different from the first sensor, and the iteratively determining the absolute position of the camera comprises:
iteratively updating the determined absolute position of the camera using different ones of the plurality of position related information data sets by,
acquiring a first one of the plurality of position related information data sets from the first sensor at a first time, the first sensor having a first accuracy level associated therewith;
determining the absolute position of the camera based on the first one of the plurality of position related information data sets;
acquiring a second one of the plurality of position related information data sets from the second sensor at a second time after the first time, the second sensor having a second accuracy level associated therewith; and
adjusting the determined absolute position of the camera based on the second one of the plurality of position related information data sets, in response to the pre-determined rule indicating that the second accuracy level is higher than the first accuracy level.

13. The method of claim 1, wherein the monitoring comprises:
determining a gaze direction or a gesture of an occupant of the vehicle captured by the camera based on the image data and the determined absolute position of the camera.

14. The method of claim 13, wherein the electronically controlling of the one or more vehicle control units of the vehicle is based on the determined gaze direction or the gesture of the occupant.

15. A system, comprising:
at least one processor configured to,
determine an absolute position of a camera mounted on a steering wheel column in a vehicle with respect to a vehicle coordinate system by at least,
acquiring a plurality of position related information data sets from a plurality of sensors,
selecting at least one of the plurality of position related information data sets based on a pre-determined rule,
determining whether the camera mounted on the steering wheel column is stationary based on at least one plurality of position related information data sets, and
in response to determining that the camera is stationary, iteratively determine the absolute position of the camera using, in each subsequent iteration, different ones of the plurality of position related information data sets captured by different ones of the plurality of sensors that have a higher degree of accuracy;
electronically monitor a cabin of the vehicle based on image data received from the camera and the determined absolute position of the camera; and
electronically control one or more vehicle control units of the vehicle based on a result of the electronically monitoring of the cabin based on the image data received from the camera and the determined absolute position of the camera.

16. The system of claim 15, wherein the at least one processor is further configured to convert each of the plurality of position related information data sets into a same data format.

17. The system of claim 15, wherein each of the position related information data sets comprises at least one of:
a previous absolute position of the camera;
an indicator indicating whether the previous absolute position is valid;
a precision of the previous absolute position;
an accuracy of the previous absolute position;
an updated absolute position of the camera;
an indicator indicating whether the updated absolute position is valid;

a precision of the updated absolute position, an accuracy of the updated absolute position;

an indicator indicating whether a movement of the camera is presently ongoing;

a certainty of a movement of the camera being presently ongoing;

an indicator indicating a movement event in a pre-determined period of past time;

an estimated distance of movement of the camera;

a timestamp indicating time at which a movement of the camera was last detected; and a timestamp for at least one information included in the position related information data set.

18. The system of claim 17, wherein the pre-determined rule is based on at least one of:

a precision of the previous absolute position of the respective position related information data set;

an accuracy of the previous absolute position of the respective position related information data set;

a precision of the updated absolute position of the respective position related information data set;

an accuracy of the updated absolute position of the respective position related information data set; and a timestamp for at least one information included in the respective position related information data set.

19. The system of claim 15, wherein the at least one processor is further configured to determine the absolute position based on fusing at least portions of the selected position related data sets.

20. The system of claim 15, wherein the at least one processor is further configured to provide the determined absolute position to a further processing element for further processing the determined absolute position.

21. A non-transitory computer readable medium comprising program instructions for causing one or more computing devices of a system to:

determine an absolute position of a camera mounted on a steering wheel column in a vehicle with respect to a vehicle coordinate system by at least, acquiring a plurality of position related information data sets from a plurality of sensors;

selecting at least one of the plurality of position related information data sets based on a pre-determined rule;

determining whether the camera mounted on the steering wheel column is stationary based on at least one plurality of position related information data sets; and in response to determining that the camera is stationary, iteratively determining the absolute position of the camera using, in each subsequent iteration, different ones of the plurality of position related information data sets captured by different ones of the plurality of sensors that have a higher degree of accuracy;

electronically monitor a cabin of the vehicle based on image data received from the camera and the determined absolute position of the camera; and electronically control one or more vehicle control units of the vehicle based on a result of the electronically monitoring of the cabin based on the image data received from the camera and the determined absolute position of the camera.

* * * * *